United States Patent
Sio et al.

(10) Patent No.: US 12,286,355 B2
(45) Date of Patent: Apr. 29, 2025

(54) ADDITIVE MANUFACTURING OF MICROANALYTICAL REFERENCE MATERIALS

(71) Applicant: Lawrence Livermore National Security, LLC, Livermore, CA (US)

(72) Inventors: Kin I Sio, Walnut Creek, CA (US); Joshua Kuntz, Livermore, CA (US); Elaine Lee, Brooklyn, NY (US); Tashi Parsons-Davis, Antioch, CA (US); Andrew Pascall, Livermore, CA (US); Kevin E. Roberts, Brentwood, CA (US); Bryan B. Bandong, Pleasanton, CA (US); Jennifer A. Shusterman, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 664 days.

(21) Appl. No.: 16/902,076

(22) Filed: Jun. 15, 2020

(65) Prior Publication Data
US 2021/0032767 A1    Feb. 4, 2021

Related U.S. Application Data

(60) Provisional application No. 62/881,830, filed on Aug. 1, 2019.

(51) Int. Cl.
*C01B 33/12* (2006.01)
*B22F 1/054* (2022.01)
(Continued)

(52) U.S. Cl.
CPC .............. *C01B 33/12* (2013.01); *B32B 18/00* (2013.01); *B33Y 10/00* (2014.12); *B33Y 40/20* (2020.01);
(Continued)

(58) Field of Classification Search
None
See application file for complete search history.

(56) References Cited

U.S. PATENT DOCUMENTS 6,487,879 B1 * 12/2002 Blackwell .......... C03C 25/1061
                                                     65/435
9,453,289 B2    9/2016 Rose et al.
(Continued)

FOREIGN PATENT DOCUMENTS

WO    WO-2017214179 A1 * 12/2017 ............... B28B 1/00

OTHER PUBLICATIONS

Han, J., Lee, E., Dudoff, J. K., Bagge-Hansen, M., Lee, J. R. I., Pascall, A. J., Kuntz, J. D., Willey, T. M., Worsley, M. A., Han, T. Y.-J., Advanced Optical Materials 2017, 5, 1600838. (Year: 2017).*
(Continued)

*Primary Examiner* — Louis J Rufo
(74) *Attorney, Agent, or Firm* — Zilka-Kotab, P.C.

(57) ABSTRACT

A method includes acquiring particles doped with at least one analyte and forming a monolithic reference material. The method includes forming includes using the analyte-doped particles as feedstock particles in an additive manufacturing process. A product includes a monolithic reference material formed of Stöber particles doped with a trace element. A method includes acquiring particles doped with platinum group elements (PGEs). The method includes forming a monolithic reference material using the PGE-doped particles as feedstock particles in an additive manufacturing process.

19 Claims, 13 Drawing Sheets

(51) Int. Cl.

| | |
|---|---|
| B22F 10/10 | (2021.01) |
| B22F 12/00 | (2021.01) |
| B32B 18/00 | (2006.01) |
| B33Y 10/00 | (2015.01) |
| B33Y 40/20 | (2020.01) |
| B33Y 70/00 | (2020.01) |
| C25D 13/02 | (2006.01) |
| C25D 15/02 | (2006.01) |

(52) U.S. Cl.
CPC .............. *B33Y 70/00* (2014.12); *C25D 13/02* (2013.01); *B22F 1/054* (2022.01); *B22F 10/10* (2021.01); *B22F 12/222* (2021.01); *C01P 2004/32* (2013.01); *C04B 2237/341* (2013.01); *C25D 15/02* (2013.01)

(56) References Cited

U.S. PATENT DOCUMENTS

| | | | |
|---|---|---|---|
| 10,407,792 B2 | 9/2019 | Rose et al. | |
| 10,533,261 B2 | 1/2020 | Rose et al. | |
| 2011/0250467 A1* | 10/2011 | Rose | C04B 37/025 |
| | | | 428/218 |
| 2016/0175935 A1* | 6/2016 | Ladewig | G02B 7/287 |
| | | | 425/78 |
| 2016/0348262 A1 | 12/2016 | Rose et al. | |
| 2016/0355944 A1 | 12/2016 | Rose et al. | |
| 2017/0252807 A1* | 9/2017 | Lund | B22F 10/16 |
| 2018/0126663 A1* | 5/2018 | Jun | B33Y 80/00 |
| 2018/0265997 A1 | 9/2018 | Mora | |
| 2018/0265998 A1 | 9/2018 | Mora | |
| 2019/0330756 A1 | 10/2019 | Rose et al. | |
| 2020/0080220 A1 | 3/2020 | Rose et al. | |
| 2020/0354542 A1* | 11/2020 | O'Sullivan | C08K 3/22 |

OTHER PUBLICATIONS

Panda, R., Jha, M.K., Pathak, D.D. (2018). Commercial Processes for the Extraction of Platinum Group Metals (PGMs). In: , et al. Rare Metal Technology 2018. TMS 2018. The Minerals, Metals & Materials Series. Springer, Cham. https://doi.org/10.1007/978-3-319-72350-1_11 (Year: 2018).*
Jochum et al., "Determination of Reference Values for NIST SRM 610-617 Glasses Following ISO Guidelines," Geostandards and Geoanalytical Research, vol. 35, No. 4, 2011 (Year: 2011).*
NIST, "About NIST SRMs," National Institute of Standards and Technology, Aug. 25, 2016, 2 pages, retrieved from https://www.nist.gov/srm/about-nist-srms.
NIST, "SRM Definitions," National Institute of Standards and Technology, Aug. 25, 2016, 2 pages, retrieved from https://www.nist.gov/srm/srm-definitions.
Pearce et al., "A Compilation of New and Published Major and Trace Element Data for NIST SRM 610 and NIST SRM 612 Glass Reference Materials," Geostandards Newsletter, vol. 21, No. 1, 1997, 30 pages.
Jochum et al., "Determination of Reference Values for NIST SRM 610-617 Glasses Following ISO Guidelines," Geostandards and Geoanalytical Research, vol. 35, No. 4, 2011.
Campbell et al., "Elimination of platinum inclusions in phosphate laser glasses," Lawrence Livermore National Laboratory, May 26, 1989, 67 pages.
Ertel et al., "Experimental study of platinum solubility in silicate melt to 14 GPa and 2273 K: Implications for accretion and core formation in Earth," Geochimica et Cosmochimica Acta, vol. 70, 2006, pp. 2591-2602.
Brenan et al., "Core formation and metal-silicate fractionation of osmium and iridium from gold," Nature Geoscience, Oct. 18, 2009, pp. 1-4.
Gilbert et al., "A comparative study of five reference materials and the Lombard meteorite for the determination of the platinum-group elements and gold by LA-ICP-MS," Geostandards and Geoanalytical Research, vol. 37, No. 1, 2013, 14 pages.
Walker et al., "Modeling fractional crystallization of group IVB iron meteorites," Geochim Cosmochim Acta, vol. 72, 2008, pp. 2198-2216.
Sylvester, P., "Matrix effects in laser ablation ICP-MS," Chapter 5, Laser Ablation ICP-MS in the Earth Sciences: Current Practices and Outstanding Issues, Mineralogical Association of Canada, Short Course Series vol. 40, Jul. 2008, pp. 67-78.
Danyushevsky et al., "Routine quantitative multi-element analysis of sulphide minerals by laser ablation ICP-MS: Standard development and consideration of matrix effects," Geochemistry: Exploration, Environment, Analysis, vol. 11, 2011, pp. 51-60.
Jochum et al., "Reference materials for elemental and isotopic analyses by LA-(MC)-ICP-MS: Successes and outstanding needs," Chapter 10, Mineralogical Association of Canada, Short Course Series vol. 40, 2008, 22 pages.
Stober et al., "Controlled Growth of Monodisperse Silica Spheres in the Micron Size Range," Journal of Colloid and Interface Science, vol. 26, 1968, pp. 62-69.
Han et al., "Tunable amorphous photonic materials with pigmentary colloidal nanostructures," Advanced Optical Materials, Jan. 2017, 38 pages.
Besra et al., "A review on fundamentals and applications of electrophoretic deposition (EPD)," Materials Science, vol. 52, 2007, pp. 1-61.
Pascall et al., "Light-Directed Electrophoretic Deposition: A New Additive Manufacturing Technique for Arbitrarily Patterned 3D Composites," Advanced Materials, vol. 26, 2014, pp. 2252-2256.
Tian et al., "Electrophoretic deposition and characterization of nanocomposites and nanoparticles on magnesium substrates," Nanotechnology, vol. 26, 2015, pp. 1-14.
Norris Scientific, "LADR—About," Norris Scientific, 2020, 2 pages, retrieved from http://norsci.com/ladr/.
Arblaster, J. W., "Vapour Pressure Equations for the Platinum Group Elements," Platinum Metals Review, vol. 51, No. 03, 2007, pp. 130-135.
Qiao et al., "Solution-phase synthesis of transition metal oxide nanocrystals: Morphologies, formulae, and mechanisms," Advances in Colloid Interface Science, 2017, pp. 199-266.
Wang et al., "Abundances of Sulfur, Selenium, Tellurium, Rhenium and Platinum-Group Elements in Eighteen Reference Materials by Isotope Dilution Sector-Field ICP-MS and Negative TIMS," Geostandards and Geoanalytical Research, 2013, pp. 1-21.
Meisel et al., "Simplified method for the determination of Ru, Pd, Re, Os, Ir and Pt in chromitites and other geological materials by isotope dilution ICP-MS and acid digestion," The Analyst, 2001, vol. 126, pp. 322-328.
Tong et al., "Control over the crystal phase, shape, size and aggregation of calcium carbonate via a L-aspartic acid inducing process," Biomaterials, vol. 25, 2004, pp. 3923-3929.
Okada et al., "Crystal growth of a hectorite-like layered silicate on monodisperse spherical silica particles with different diameters," Clay Science, vol. 19, 2015, pp. 45-51.
Liezers et al., "The formation of trinitite-like surrogate nuclear explosion debris (SNED) and extreme thermal fractionation of SRM-612 glass induced by high power CW CO2 laser irradiation," Journal of Radioanalytical and Nuclear Chemistry, vol. 304, 2015, pp. 705-715.
Molgaard et al., "Development of synthetic nuclear melt glass for forensic analysis," Journal of Radioanalytical and Nuclear Chemistry, vol. 304, 2015, pp. 1293-1301.
Nizinski et al., "Production and characterization of synthetic urban nuclear melt glass," Journal of Radioanalytical and Nuclear Chemistry, Oct. 2017, 7 pages.
Sio et al., Discerning crystal growth from diffusion profiles in zoned olivine by in situ Mg—Fe isotopic analyses, Geochimica et Cosmochimica Acta, vol. 123, pp. 302-321.
Weisz et al., "Deposition of vaporized species onto glassy fallout from a near-surface nuclear test," Elsevier, 2016, 63 pages.
Savina et al., "A New Resonance Ionization Mass Spectrometry Scheme for Improved Uranium Analysis," Analytical Chemistry, Jun. 11, 2018, 12 pages.

(56) References Cited

OTHER PUBLICATIONS

Giminaro et al., "Compositional planning for development of synthetic urban nuclear melt glass," Journal of Radioanalytical and Nuclear Chemistry, vol. 306, 2015, pp. 175-181.
Golubeva et al., "Synthetic Nanoclays with the Structure of Montmorillonite: Preparation, Structure, and Physico-Chemical Properties," Glass Physics and Chemistry, vol. 39, No. 5, 2013, pp. 533-539.
Mora, J., U.S. Appl. No. 15/462,610, filed Mar. 17, 2017.
Mora, J., U.S. Appl. No. 15/981,780, filed May 16, 2018.
Rose et al., U.S. Appl. No. 13/085,405, filed Apr. 12, 2011.
Rose et al., U.S. Appl. No. 15/236,308, filed Aug. 12, 2016.
Rose et al., U.S. Appl. No. 15/236,313, filed Aug. 12, 2016.
Rose et al., U.S. Appl. No. 16/505,431, filed Jul. 8, 2019.
Rose et al., U.S. Appl. No. 16/683,101, filed Nov. 13, 2019.
Kane, J.S., "A History of the Development and Certification of NIST Glass SRMs 610-617," Geostandards Newsletter, The Journal of Geostandards and Geoanalysis, vol. 22, No. 1, 1998, pp. 7-13.
Eggins et al., "Compositional Heterogeneity in NIST SRM 610-617 Glasses," Geostandards Newsletter, The Journal of Geostandards and Geoanalysis, vol. 26, No. 3, 2002, pp. 269-286.
Hu et al., "Results for Rarely Determined Elements in MPI-DING, USGS and NIST SRM Glasses Using Laser Ablation ICP-MS," Geostandards and Geoanalytical Research, vol. 33, No. 3, 2009, pp. 319-335.
Cottrell et al., "Constraints on core formation from Pt partitioning in mafic silicate liquids at high temperatures," Geochimica et Cosmochimica Acta, vol. 70, 2006, pp. 1565-1580.
Mann et al., "Partitioning of Ru, Rh, Pd, Re, Ir and Pt between liquid metal and silicate at high pressures and high temperatures—Implications for the origin of highly siderophile element concentrations in the Earth's mantle," Geochimica et Cosmochimica Acta, vol. 84, 2012, pp. 593-613.
Brenan et al., "Experimental Results on Fractionation of the Highly Siderophile Elements (HSE) at Variable Pressures and Temperatures during Planetary and Magmatic Differentiation," Reviews in Mineralogy & Geochemistry, vol. 81, 2016, pp. 1-87.
Medard et al., "Platinum partitioning between metal and silicate melts: Core formation, late veneer and the nanonuggets issue," Geochimica et Cosmoshimica Acta, vol. 162, 2015, pp. 183-201.
Bennett et al., "The solubility of platinum in silicate melt under reducing conditions: Results from experiments without metal inclusions," Geochimica et Cosmochimica Acta, vol. 133, 2014, pp. 422-442.

Mungall et al., "Partitioning of platinum-group elements and Au between sulfide liquid and basalt and the origins of mantle-crust fractionation of the chalcophile elements," Geochimica et Cosmochimica Acta, vol. 125, 2014, pp. 265-289.
Liu et al., "Synthesis of a Chalcogenide Glass Standard for Laser Ablation-Inductively Coupled Plasma-Mass Spectrometry (LA-ICP-MS)," Economic Geology, vol. 112, 2017, pp. 2005-2021.
Kuhn et al., "Laser ablation-ICP-MS: particle size dependent elemental composition studies on filter-collected and online measured aerosols from glass," Journal of Analytical Atomic Spectrometry, vol. 19, 2004, pp. 1158-1164.
Matijevic, E., "Preparation and Properties of Uniform Size Colloids," Chemistry of Materials, vol. 5, 1993, pp. 412-426.
Sylvester et al., "Analysis of Re, Au, Pd, Pt and Rh in NIST Glass Certified Reference Materials and Natural Basalt Glasses by Laser Ablation ICP-MS," Geostandards Newsletter, The Journal of Geostandards and Geoanalysis, vol. 21, No. 2, 1997, pp. 215-229.
Sun et al., "Routine Os analysis by isotope dilution-inductively coupled plasma mass spectrometry: $OsO_4$ in water solution gives high sensitivity," Journal of Analytical Atomic Spectrometry, vol. 16, 2001, pp. 345-349.
Ogihara et al., "Preparation of monodispersed, spherical ferric oxide particles by hydrolysis of metal alkoxides using a continuous tube-type reactor," Advanced Powder Technology, vol. 8, No. 1, 1997, pp. 73-84.
Boyet et al., "Sm—Nd systematics of lunar ferroan anorthositic suite rocks: Constraints on lunar crust formation," Geochimica et Cosmochimica Acta, vol. 148, 2015, pp. 203-218.
Carney et al., "The development of radioactive glass surrogates for fallout debris," Journal of Radioanalytical and Nuclear Chemistry, vol. 299, 2014, pp. 363-372.
Becker et al., "Quantitative images of metals in plant tissues measured by laser ablation inductively coupled plasma mass spectrometry," Spectrochimica Acta Part B, vol. 63, Aug. 14, 2008, pp. 1248-1252.
Eppich et al., "Characterization of low concentration uranium glass working materials," Lawrence Livermore National Laboratory, Mar. 22, 2016, pp. 1-22.
Flachsbart et al., "Preparation of Radioactively Labeled Monodisperse Silica Spheres of Colloidal Size," Journal of Colloid and Interface Science, vol. 30, No. 4, Aug. 1969, pp. 568-573.
Giera et al., "Mesoscale Particle-Based Model of Electrophoretic Deposition," Langmuir, vol. 33, 2017, pp. 652-661.

* cited by examiner

| Type of Reference Material | | Ru | Rh | Pd | Os | Ir | Pt |
|---|---|---|---|---|---|---|---|
| Synthesized, in-house, EPD4-reduced | µg/g | 1.05 | 1.06 | 0.85 | 0.55 | 0.92 | 2.79 |
| | RSD# | 3% | 2% | 5% | 4% | 3% | 5% |
| Synthesized, in-house, EPD5-reduced | µg/g | 1.05 | 1.03 | 0.86 | 0.55 | 0.87 | 2.46 |
| | RSD# | 5% | 2% | 6% | 2% | 2% | 4% |
| Synthesized, NIST®, NIST® 610-611 | µg/g | - | 1.29 | 1.21 | - | - | 3.12 |
| | RSD# | - | 3-5% | >10% | - | - | 5-10% |
| Synthesized, NIST®, NIST® 612-613 | µg/g | 0.0011 | 0.91 | 0.84 | - | 0.0048 | 2.41 |
| | RSD# | 91% | 3-5% | >10% | - | 8% | 5-10% |
| Synthesized, in-house, HSE-1 | µg/g | 4.3 | 15.3 | 14.3 | - | 13.6 | 119 |
| | RSD | 25-30% | 25-30% | 25-30% | - | 35-40% | 35-40% |
| Geologic glass, MPI, ATHO-G | µg/g | - | 0.076 | 0.092 | - | 0.027 | 1.09 |
| | RSD | - | 13% | 14% | - | 52% | 34% |
| Geologic glass, MPI, GOR128-G | µg/g | - | 0.018 | 0.1 | - | 0.1 | 10.4 |
| | RSD | - | 6% | 10% | - | 10% | 4% |
| Geologic glass, MPI, GOR132-G | µg/g | - | 0.43 | 0.11 | - | - | 12.1 |
| | RSD | - | 9% | 9% | - | - | 6% |
| Geologic glass, MPI, KL2-G | µg/g | - | 8.53 | 0.2 | - | 0.12 | 7.29 |
| | RSD | - | 14% | 10% | - | 17% | 5% |

FIG. 11

| Type of Reference Material | | Ru | Rh | Pd | Os | Ir | Pt |
|---|---|---|---|---|---|---|---|
| Geologic glass, MPI, ML3B-G | µg/g | - | 1.51 | 0.16 | - | 0.046 | 9.51 |
| | RSD | - | 39% | 6% | - | 15% | 8% |
| Geologic glass, MPI, GStHs6/80-G | µg/g | - | 0.35 | 0.12 | - | 0.049 | 2.00 |
| | RSD | - | 1% | 8% | - | 10% | 5% |
| Geologic glass, MPI, T1-G | µg/g | - | 1.21 | 0.13 | - | 0.019 | 4.02 |
| | RSD | - | 2% | 8% | - | 16% | 4% |
| Geologic glass, USGS, BCR-2G | µg/g | - | 0.00048 | 0.024 | - | 0.011 | 0.44 |
| | RSD | - | 31% | 42% | - | 27% | 20% |
| Geologic glass, USGS, BHVO-2G | µg/g | - | 0.018 | 0.024 | - | 0.011 | 0.73 |
| | RSD | - | 17% | 29% | - | 18% | 51% |
| Geologic glass, USGS, BIR-2G | µg/g | - | 0.0022 | 0.018 | - | 0.0037 | 1.36 |
| | RSD | - | 23% | 17% | - | 35% | 35% |
| Non-silicate reference materials | | | | | | | |
| Synthesized, in-house, NiS-3 | µg/g | 23.3 | 22.9 | 24.1 | 23.8 | 22.5 | 22.5 |
| | RSD | 3% | 6% | 18% | 3% | 4% | 8% |
| Synthesized, in-house, PGE-A | µg/g | 204 | 210 | 248 | 72.7 | 121 | 184 |
| | RSD | 5% | 7% | 10% | 10% | 10% | 7% |
| Synthesized, in-house, PO724-T | µg/g | 31 | 35.8 | 48.9 | 36.5 | 34 | 38.7 |
| | RSD | 3% | 1% | 2% | 4% | 3% | 3% |

FIG. 11 (continued)

| Type of Reference Material | | Ru | Rh | Pd | Os | Ir | Pt |
|---|---|---|---|---|---|---|---|
| Synthesized, in-house, P0727-T1 | µg/g | 36.8 | 41.6 | 47.8 | 45 | 45.5 | 36.1 |
| | RSD | 2% | 1% | 2% | 2% | 2% | 2% |
| Synthesized, in-house, 8b | µg/g | 58.8 | 57.9 | 68.5 | 68.5 | 56.9 | 63.2 |
| | RSD | 7% | 3% | 3% | 12% | 7% | 3% |
| Meteorite, Lombard | µg/g | 13.6 | 2.2 | 1.5 | 0.7 | 2.3 | 17.4 |
| | RSD | 6% | 5% | 7% | 6% | 4% | 5% |
| Synthesized, in-house, JB-sulfide | µg/g | 260 | 237 | 247 | 302 | 315 | 294 |
| | RSD | 12% | 2% | 2% | 3% | 8% | 3% |
| Synthesized, in-house, Ge4 | µg/g | 22.5 | 49.0 | 42.6 | 26.3 | 63.4 | 66.8 |
| | RSD | 5% | 2% | 4% | 6% | 6% | 7% |

FIG. 11 (continued)

ADDITIVE MANUFACTURING OF MICROANALYTICAL REFERENCE MATERIALS

RELATED APPLICATIONS

This application claims priority to Provisional U.S. Appl. No. 62/881,830 filed on Aug. 1, 2019, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to additive manufacturing, and more particularly, this invention relates to additive manufacturing of microanalytical reference materials.

BACKGROUND

Reference materials (RMs) are sufficiently homogeneous and stable with respect to one or more specified properties. The properties may be quantitative and/or qualitative, e.g., for identification of substances or species. Reference materials are established to be fit for an intended use in a measurement process, calibration of a measurement system, assessment of a measurement process, assigning values to other materials, quality control, etc. A single RM typically cannot be used for both calibration and validation of results in the same measurement procedure.

Certified reference materials (CRMs) are characterized by a metrologically valid procedure for one or more specified properties. CRMs are accompanied by a certificate that provides the value of the specified property, any uncertainty associated with the property, and a statement of metrological traceability. The concept of value includes qualitative attributes such as identity or sequence. Uncertainties for such attributes may be expressed as probabilities.

Each National Institute of Standards and Technology® (NIST®) Standard Reference Material (SRM®) meets additional NIST®-specific certification criteria. A NIST® SRM® is issued with a certificate reporting the results of its characterizations and information regarding the appropriate uses of the material. SRMs® are prepared and used to help develop accurate methods of analysis, calibrate measurement systems used to facilitate exchange of goods, institute quality control, determine performance characteristics, measure a property at the state-of-the-art limit, ensure the long-term adequacy and integrity of measurement quality assurance programs, etc.

Laser ablation inductively coupled plasma mass spectrometry (LA-ICPMS) is a widely used microanalytical tool throughout various fields including Earth science, planetary science, material science, forensic science, biological science, etc. LA-ICPMS commonly employs NIST® SRMs® (e.g., NIST® 610-617) for calibration purposes. However, these silicate glasses were originally synthesized for bulk rather than in situ analyses. As a result, several commonly used NIST® glasses have been shown to possess significant spatial heterogeneity in some elements. Therefore, there is a pressing need for the production of microanalytical standards for use as reference materials.

SUMMARY

A method, according to one embodiment, includes acquiring particles doped with at least one analyte and forming a monolithic reference material. The method includes forming includes using the analyte-doped particles as feedstock particles in an additive manufacturing process.

A product, according to another embodiment, includes a monolithic reference material formed of Stöber particles that are doped with a trace element.

A method, according to yet another embodiment, includes acquiring particles doped with platinum group elements (PGEs). The method includes forming a monolithic reference material using the PGE-doped particles as feedstock particles in an additive manufacturing process.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 11 is a table of concentrations and relative standard deviation (RSD) values associated with various samples produced by at least some of the approaches described herein for comparison with concentrations and RSD values known in the art.

DETAILED DESCRIPTION

Figure 1:
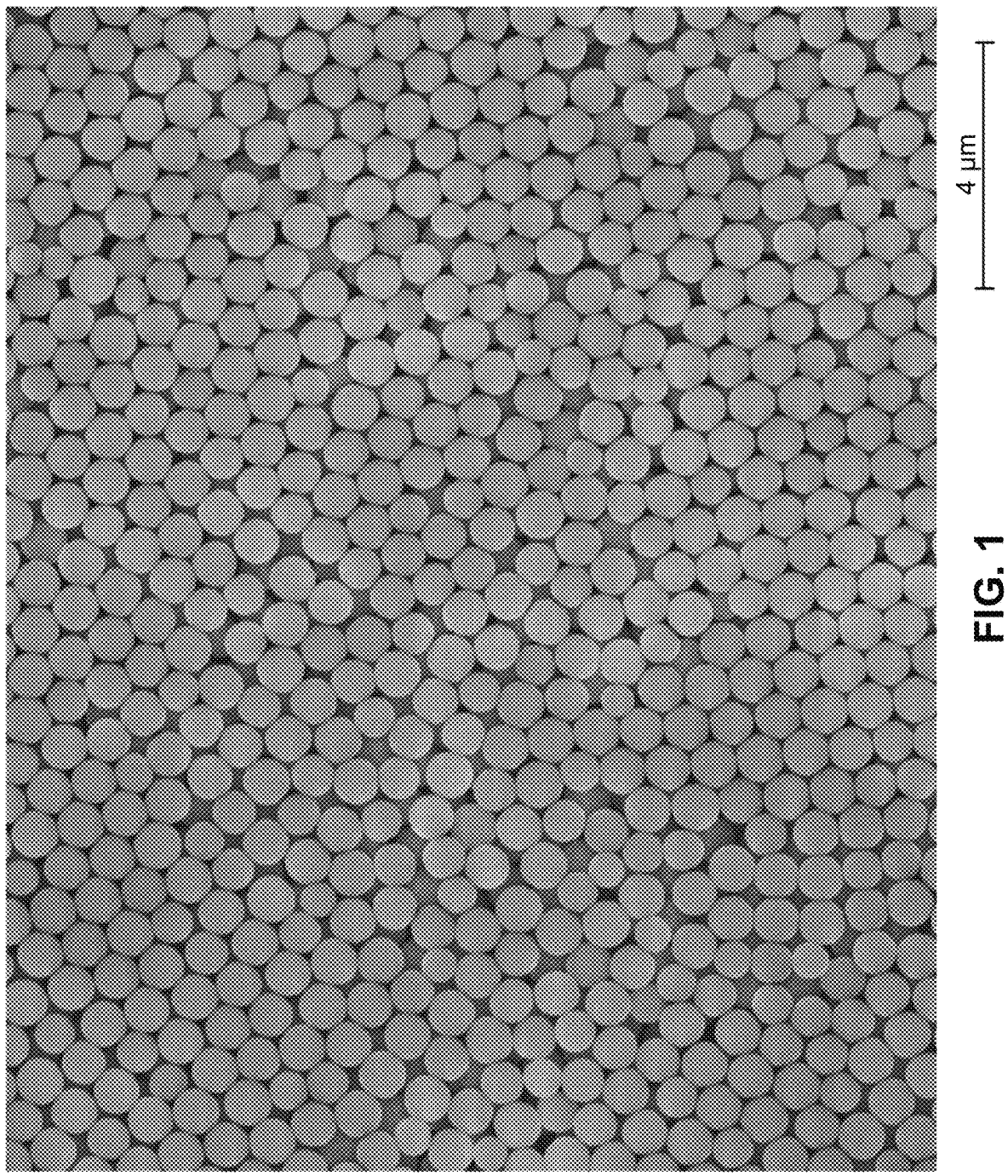
FIG. 1 is a secondary electron image of the synthesized Stöber particles doped with neodymium (Nd) and precious metals.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The following description discloses several preferred aspects of methods for and products of additive manufacturing of microanalytical reference materials.

In one general embodiment, a method includes acquiring particles doped with at least one analyte and forming a monolithic reference material. The method includes forming includes using the analyte-doped particles as feedstock particles in an additive manufacturing process.

In another general embodiment, a product includes a monolithic reference material formed of Stöber particles doped with a trace element.

In yet another general embodiment, a method includes acquiring particles doped with platinum group elements (PGEs). The method includes forming a monolithic reference material using the PGE-doped particles as feedstock particles in an additive manufacturing process.

NIST® SRMs® are materials with well-categorized composition and/or properties. SRMs® are used for accurate and compatible measurements in instrument calibrations, in units as part of overall quality assurance programs, to verify the accuracy of specific measurements, to support the development of new measurement methods, etc. SRMs® are used in industrial materials production, industrial materials analysis, environmental analysis, biological and medical applications, any other measurements, etc.

Various approaches described herein include methods to manufacture reference materials for use as calibration standards for elemental and isotopic analyses. Specifically, in a preferred approach, Stöber particles are used as starting materials for the production of reference materials and electrophoretic deposition (EPD) is used to 3-dimensionally (3D) print reference materials. In preferred approaches, the reference materials are calcined to transform the Stöber particles into silica particles, and sintered under controlled atmospheric and temperature conditions to produce a densified solid. These reference materials and methods of manufacture may be tuned to produce either chemically and isotopically homogenous materials and/or materials with a patterned geometry of different components and concentrations.

Currently available commercial methods of synthesizing solid reference materials, including those employed by NIST®, include mixing starting materials in desired proportions and melting the mixture for a duration which is long enough to homogenize the mixture. Various starting materials used in conventional synthesis techniques include oxides, carbonates, sol-gels, etc. The mixture is melted and quenched to form a glass. These methods are unsuccessful in homogeneously distributing some elements, including the platinum group elements (PGEs). The foregoing elements commonly form metallic nuggets in silicate melts and are difficult to homogeneously distribute in a solid reference material. Because of this problem, there are no reference materials or SRMs® for calibrating in situ measurement of the full suite of PGEs in a silicate matrix. This work introduces a new method to synthesize solid reference materials that does not require melting of the components, which helps to prevent the formation of metallic nuggets.

In some known methods, homogenous in-house standards are made by employing matrix compositions which are good solvents for the analytes. However, the compositions of these matrices are limited in scope. Internal standardization to a minor isotope of a major element (e.g., commonly $^{43}$Ca and $^{29}$Si) may correct for different ablation rates between standard and sample. However, internal standardization cannot be used to correct for laser- and ICP-induced fractionations for samples with different matrices. Thorough efforts are thus needed to qualify the use of non-matrix-matched samples and standards. The validation required when using non-matrix-matched samples and standards imposes a significant burden on analysts. Moreover, not all samples are expected to be amenable to analysis using standards with a significantly different composition. To address this issue, the approach described herein is tunable to produce reference materials of any major, minor, and trace element chemical and isotopic compositions so that the sample and the standard are matrix-matched.

Furthermore, the size of the in-house reference materials manufactured according to conventional methods is typically limited to only a few cubic millimeters and so may be consumed quickly by various destructive analytical methods. These mm-sized samples are of insufficient size for widespread distribution of the same material to multiple laboratories. There is an outstanding need to produce reference materials for distribution to multiple laboratories for method development and interlaboratory comparison exercises.

Various approaches disclosed herein describe methods for the production of reference materials. Particles with controlled compositions are synthesized and arranged in a 3-dimensional pattern and/or structure using additive manufacturing methods. The fabricated solid may then be thermally processed to densify the product.

In at least some approaches, various particles may be synthesized and doped with analytes throughout the synthesis. An analyte may be any major element, minor element, or trace element. A major element is any element which comprises at least 1 weight % of the reference material. A minor element is any element which comprises about 0.01 weight % to about 1 weight % of the reference material. A trace element is any element having a concentration of less than 100 parts per million (ppm) in the reference material. The synthesized particles may be doped with analytes during and/or after the synthesis of the particles. In at least some techniques, the particles are synthesized and/or grown out of a liquid phase solution.

In one approach, the base particles for use in additively manufacturing the disclosed reference materials are analyte-doped Stöber particles. The modified Stöber reaction may include a mixture of ethanol, ammonia, water, and tetraethyl orthosilicate (TEOS) in preferred amounts determinable by one having ordinary skill in the art. Reagents may be added in increments and the order of the addition of different reagents and their ratios may be varied to optimize the incorporation of analytes into the particles and/or to optimize the particle size as would be understood by one having ordinary skill in the art upon reading the present disclosure. Any sol-gel synthesis methods may be used.

In other approaches, metal oxides may be synthesized and doped in a similar method with analytes to produce reference materials as described herein. Additional reagents, such as acetonitrile, octanol, citric acid, amino acids, etc., may be added to inhibit and/or decrease the reactivity of the metals so that the metals do not gel into large conglomerates. Exemplary metal oxides include iron oxide, aluminum oxide, sodium oxide, potassium oxide, magnesium oxide, titanium oxide, nickel oxide, etc.

In other approaches, carbonates, including calcium carbonate, or phosphates, such as calcium phosphate, may be synthesized using any hydrothermal synthesis for use in the various aspects described herein. Metal hydroxides, such as iron hydroxide, may be prepared by precipitation for use in the various aspects described herein.

In other approaches, any particle which stops growing in size during synthesis may be synthesized for performing various operations described herein. In preferred approaches, the synthesized particles are monodispersed for suspension for the EPD processes described below. The particles may be polymer based. For instance, polystyrene, polymethylmethacrylate, hydrogel particles, etc., may also be doped and used in the process described in detail below.

In a preferred approach, any synthesized particle containing the desired analyte(s) may be coated using the modified Stöber reaction to render similar surface chemistry for all particles to be utilized in the EPD processes described below.

In some approaches, an analyte may be any element and/or any isotope. In some approaches, an analyte may be a transition metal, an alkali metal, an alkaline earth metal, a metalloid, any other metal, an actinide, a lanthanide, etc. Analytes are added to particle synthesis reaction mixtures in relatively small volumes of aqueous solutions. The volume is typically less than 0.05% of the reaction solution volume for minimum influence on the concentration of water and/or on the pH of the reaction mixture. The analytes are typically introduced to the particle synthesis reaction mixture as solvated or complexed ions. For example, in one approach, analytes are dissolved to concentrations up to 0.1 g/mL in hydrochloric acid (HCl) or nitric acid ($HNO_3$). The particles may be doped with the trace elements in a solution phase during the sol-gel or hydrothermal synthesis. Analytes may be added all at once in the early stages of particle synthesis, or in increments as the particles grow. The temperature, time, and other lab conditions are dictated by the type of particle synthesis being employed, as would be determinable by one having ordinary skill in the art upon reading the present disclosure. For example, sol-gel reactions are typically performed at room temperature (at about 15° C. to about 30° C.) and are completed in between 1 hour and 24 hours. Hydrothermal and solvothermal syntheses often require elevated temperatures (from about 60° C. to about 200° C.) and up to 2 weeks reaction time. The amount of analyte is calculated based on the desired concentration in the bulk sample, accounting for the expected efficiency of incorporation and loss during heat treatment, if any. Particles with specified concentrations of analytes as synthesized herein may be used as the feedstock particles for EPD or other additive manufacturing processes. In other processes, the doped particles may be used as a reference material for particulate based reference materials.

In one exemplary approach, stable and/or radioactive isotopes may be used as dopants. Isotopes may be added in a specific amounts and/or proportions to validate analytical methods (e.g., mass spectrometry and spectroscopy). Some spectroscopy methods (e.g., Mössbauer) are only sensitive to certain isotopes of a few elements on the periodic table. Thus, the ability to add an element enriched in an isotope (rather than in natural isotopic ratios) yields an increase in sensitivity resulting in shorter analysis time and potentially better calibrations. The doping of radioactive isotopes is useful for technical nuclear forensics exercises for which analytical timeline is an important part of the evaluation. Besides nuclear forensics applications, standards containing radioactive isotopes would be useful for calibration in autoradiography, gamma spectrometry, and other analytical techniques based on nuclear decay counting, which are used broadly in nuclear science and industry.

FIG. 1 is a secondary electron image of the synthesized Stöber particles doped with neodymium (Nd) and precious metals (e.g., Au, Os, Pt, Rh, Ir, Pd, Re, Ru). A scanning electron microscope was used to take the secondary electron image. The synthesized particles for EPD have a particle size of about 1 micron in diameter in one exemplary reaction. The scale bar is 4 μm.

The doped synthesized particles in the mother solution from the synthesis are centrifuged in preferred approaches. The doped synthesized particles may be rinsed with ethanol, or any conventional organic solvents, at least once in some approaches. In one approach, the doped synthesized particles are resuspended in ethanol for use as feedstock particles for the EPD processes described below.

In preferred aspects, the doped synthesized particles are used as feedstock particles for EPD to print samples of various sizes. EPD includes depositing particles suspended in a solution onto an electrode under the influence of an electric field. Although production of a homogeneous sample does not require EPD, EPD may be employed such that composites of samples in pre-defined patterns are produced using established techniques. EPD permits composites of standards to be printed with geometries which are convenient for loading into typical microanalytical sample stages.

In one aspect, a sample printed by EPD is up to 20×20×4 $mm^3$ in size. The size of the printed samples produced according to the methods described herein are large compared to the typical spatial resolutions of electron probe micro analyzer (EPMA), LA-ICPMS, (Nano-) secondary ion mass spectrometry (SIMS), and resonance ionization mass spectrometry (RIMS). Typical spatial resolutions are tens of nanometers to hundreds of microns diameter and less than hundreds of microns depth.

Figure 2:
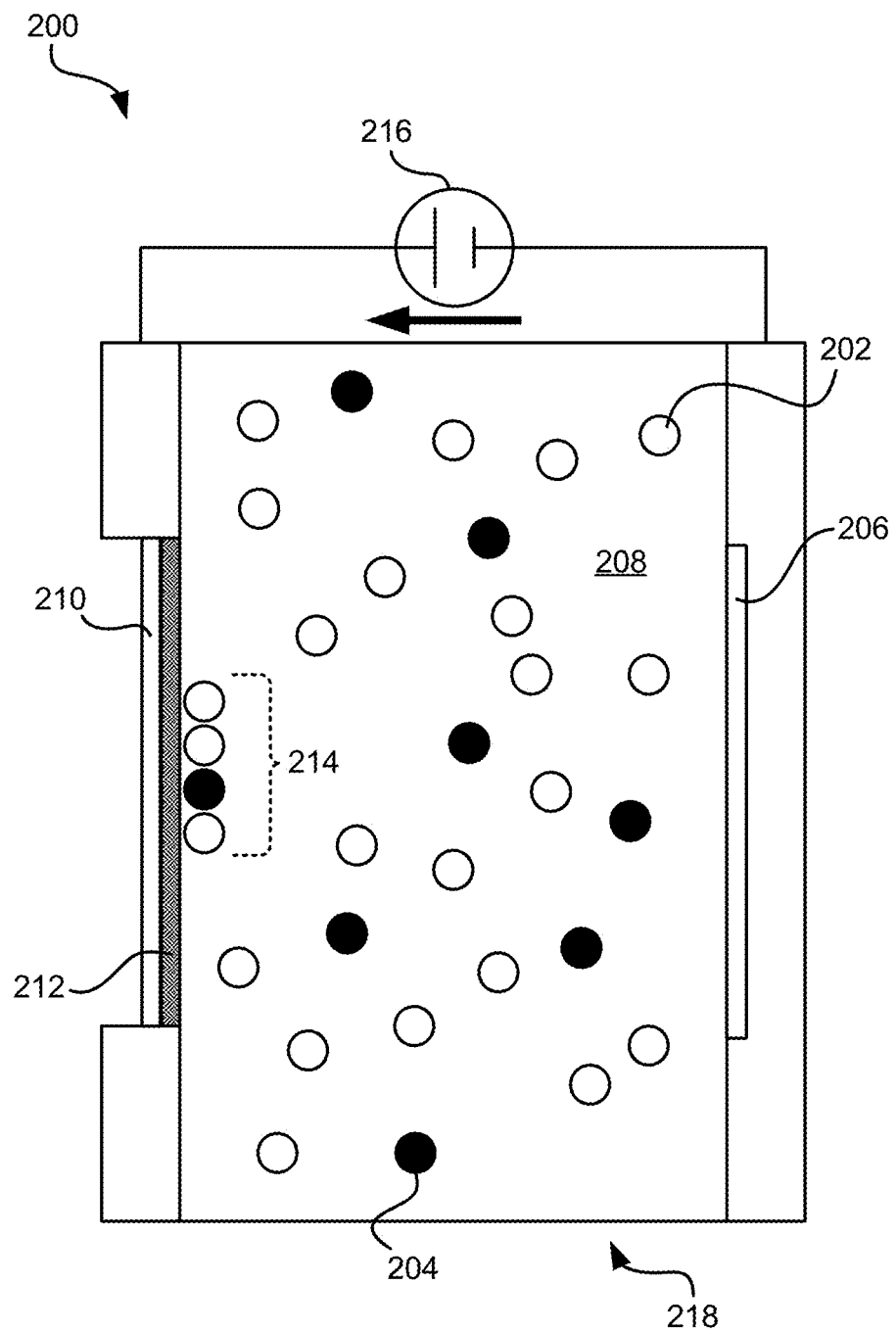
FIG. 2 is a simplified schematic diagram of an electrophoretic deposition (EPD) device.

As shown in FIG. 2, an EPD device 200 may include a first electrode 210 and a second electrode 206 positioned on either side of an EPD chamber 218, with a voltage differential 216 applied across the two electrodes 206, 210 that causes charged nanoparticles 202 and/or 204 in a solvent 208 to move toward the first electrode 210 as indicated by the arrow. In some aspects, a substrate 212 may be placed on a side of the first electrode 210 facing the second electrode 206 such that nanoparticles 214 may collect thereon.

The EPD device 200, in some configurations, may be used to deposit materials to the first electrode 210 or to a conductive or non-conductive substrate 212 positioned on a side of the electrode 210 exposed to a solvent 208 including the nanoparticles 202, 204 to be deposited. By controlling certain characteristics of formation of structures in an EPD process, such as the precursor material composition (e.g., homogenous or heterogeneous nanoparticle solutions) and orientation (e.g., non-spherical nanoparticles), deposition rates (e.g., by controlling an electric field strength, using different solvents, etc.), particle self-assembly (e.g., controlling electric field strength, particle size, particle concentration, temperature, etc.), material layers and thicknesses (e.g., through use of an automated sample injection system and deposition time), and deposition patterns with each layer (e.g., via use of dynamic electrode patterning), intricate and complex structures may be formed using EPD processes that may include a plurality of densities, microstructures, gradients, and/or compositions, according to various configurations described herein.

In at least some approaches, the reference materials are 3D printed using light-directed EPD processes.

Figure 3:
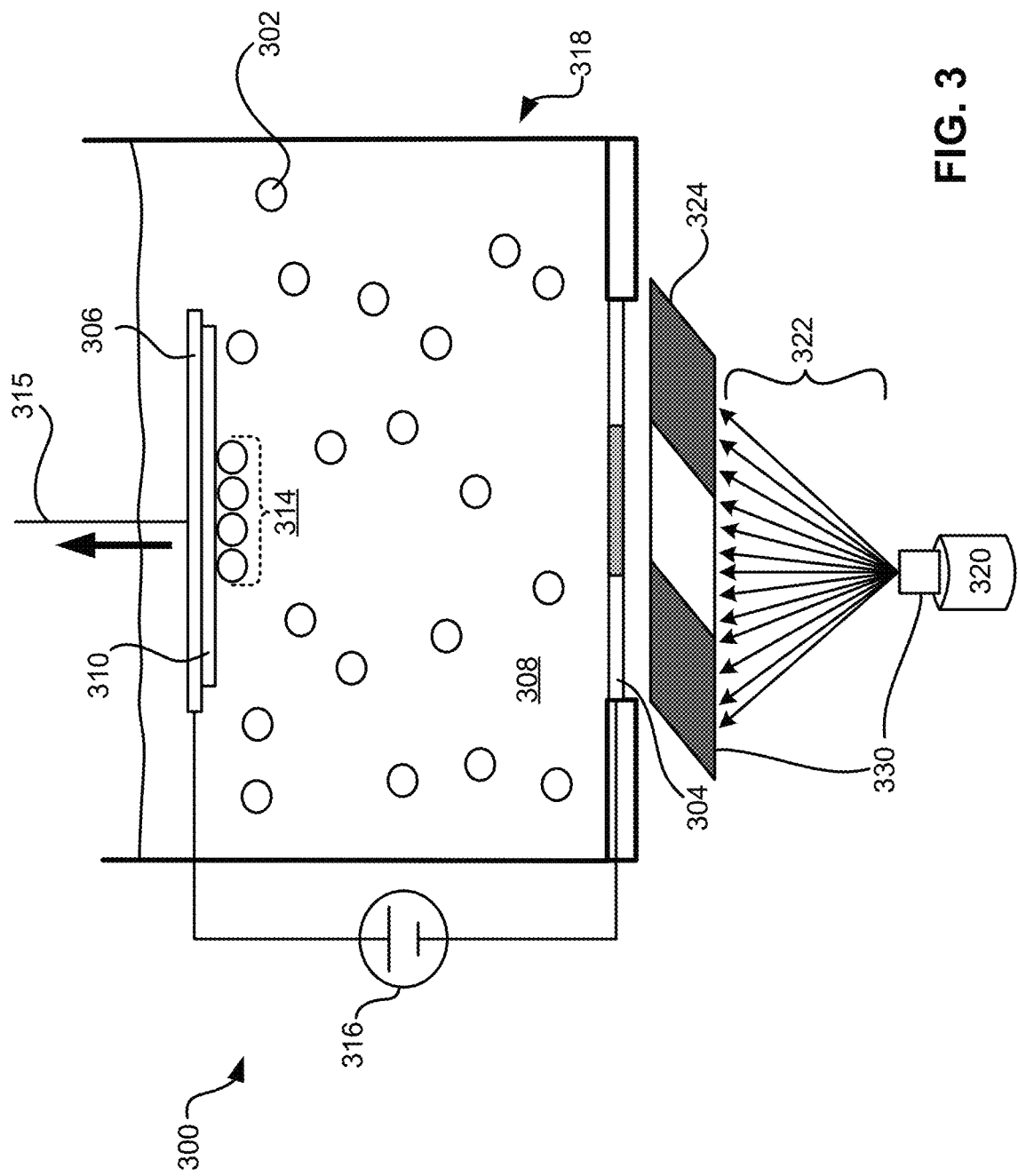
FIG. 3 is a simplified schematic drawing of a light-directed EPD system.

FIG. 3 depicts an EPD device 300 that forms a structure by electrophoretic deposition and/or electroplating in accordance with one aspect. As an option, the present device 300 may be implemented in conjunction with features from any other aspect listed herein, such as those described with reference to the other FIGS. Of course, however, such device 300 and others presented herein may be used in various applications and/or in permutations which may or may not be specifically described in the illustrative aspects listed herein. Further, the device 300 presented herein may be used in any desired environment. It should be noted that the EPD device 300 of FIG. 3 is not drawn to scale, but rather is illustrated to show the features of the present configuration.

The EPD device 300 may include a movable deposition electrode and/or photoconductive electrode, and/or may selectively alter a light path, to enable generation of structures over larger areas. As shown in FIG. 3, an EPD device 300 may include a first electrode 306 and a second electrode 304 positioned on opposite sides of an EPD chamber 318, with a voltage differential 316 applied across the two electrodes 306, 304 that causes charged nanoparticles 302 in a bath 308 to move toward the first electrode 306 as indicated by the arrow. In some aspects, a substrate 310 may be placed on a side of the first electrode 306 facing the second electrode 304 such that a layer 314 of nanoparticles 302 may collect thereon.

The EPD device 300, in some aspects, may be used to deposit materials to the first electrode 306 or to a conductive substrate 310 positioned on a side of the electrode 306 facing the second electrode 304 and exposed to a bath 308 including the nanoparticles 302 to be deposited. In a similar manner as device 200, described in detail above with reference to FIG. 2, controlling certain characteristics of the formation of structures in an EPD process produces intricate and complex structures that may include a plurality of densities, microstructures, gradients, and/or compositions, according to various approaches described herein.

Equation 1 sets out the basic system-level model for electrophoretic deposition, where $W_{film}$ is the mass of the deposition layer, $\mu$ is the electrophoretic mobility, E is the electric field, A is the area of the electrode substrate, C is the deposition particle mass concentration, and t is the deposition time.

$$W_{film} = \int_{t1}^{t2} \mu E \, A \, C \, dt \qquad \text{Equation 1}$$

Combining these principles with dynamic patterning and sample delivery, electrophoretic deposition may be employed to produce a diverse set of products with unique and/or difficult to obtain shapes, designs, and/or properties custom-fitted to any of a number of practical applications as would be determinable by one having ordinary skill in the art in view of the present disclosure.

In one approach, EPD technology may be combined with pattern-oriented deposition in order to effectuate complex two- and three-dimensional patterning structures. In another approach, coordinating sample injection during EPD further enables complex patterning of structures of a deposited material in complex two- and three-dimensional arrangements.

As illustrated in FIG. 3, the mechanism 330 for directing light is positioned near the photoconductive electrode 304. Therefore, the light 322 from the light source 320 passes through the mechanism 330 for directing light prior to reaching the photoconductive electrode 304. The mechanism 330 for directing light may include one or more mirrors, one or more lenses, and/or any other mechanism 330 for directing light that would become apparent to one of skill in the art upon reading the present description.

Note that the mechanism 330 for directing light may provide one or more patterns to the light 322 (e.g., to alter the light 322 from the light source 320), e.g., via one or more filters, or one or more patterned screens 324, or one of any other mechanism for patterning light that would become apparent to one of skill in the art upon reading the present description. In some approaches, the light directed by the mechanism for directing light may illuminate the photoconductive electrode through a mask, a raster graphics image, a grid of pixels, a bitmapped display, etc. In other approaches, the dimensions of the light illuminated on the photoconductive electrode may be pixel width; a beam; in the shape of a square, oval, rectangle, etc.; etc.

Dynamic altering of the light 322 may be greatly enhanced, for example, the mechanism 330 for directing light may be programmed to change over time to allow light 322 to reach the photoconductive electrode 304 according to a patterned screen 324.

In various aspects, following electrophoretic deposition of a layer 314 of nanoparticles 302 on the substrate 310, the actuator arm 315 of the deposition electrode 306 may move the deposition electrode 306 in the direction of the arrow a distance of about the width of one layer 314 of nanoparticles 302, thereby setting the deposition electrode 306 into position for deposition of a second layer of nanoparticles above the first layer 314 of nanoparticles 302.

In another approach, multiple materials may be combined during patterning by way of coordinated sample injection in order to effectuate complex electrochemical and structural arrangements. By way of example, this approach may be employed to accomplish sample doping or to form ceramics or composites, such as ceramic metals (cermets). During some approaches that involve the deposition of different materials on a single layer, the actuator arm 315 of the deposition electrode 306 may not move until deposition of all materials for a specific image or pattern for the single layer 314 of nanoparticles 302 is complete.

Similarly, multiple dynamic patterns may be overlaid in combination with dynamic sample injection during the EPD process to generate a layered structure having differing arrangements, densities, microstructures, and/or composition according to any number of factors, including preferences, application requirements, cost of materials, etc.

In preferred aspects, a light-directed EPD process uses a photoconductive electrode to create a spatially resolved analyte profile within the reference materials. Light-directed EPD may be used to control the spatial distribution of the analyte throughout the sample (e.g., light-directed EPD may be used to control a gradient of the analyte throughout the sample). For example, a first feedstock containing an analyte may be printed in one location in the sample and a second feedstock containing a different analyte may be printed in a relatively higher or lower concentration in a second location in the sample. In another example, a feedstock containing an analyte may be printed in one location in the sample in a first concentration and a second feedstock containing a higher or lower concentration of the same analyte may be printed in a relatively higher or lower concentration in a second location in the sample. The change in concentration can be continuous or incremental. Light-directed EPD may be used to print the reference materials in a variety of forms ranging from relatively simple to relatively complex forms for use in various analysis and/or calibration techniques. In various approaches, any EPD technique may be used to form a reference material comprising physical characteristics associated with additive manufacturing such as pre-defined gradients and/or patterns of the analyte(s) and/or concentration(s) of the analyte(s). In preferred approaches, additive manufacturing techniques may be used to form a reference material which exhibits pre-defined patterns of the analyte-doped particles in geometries suitable for microanalytical analyses. The pre-defined patterns and/or gradients are controllable by adjusting the additive manufacturing techniques as would be understood by one having ordinary skill in the art upon reading the present disclosure. The pre-defined patterns and/or gradients may be defined by an analyst, the manufacturer, etc.

Figure 4:
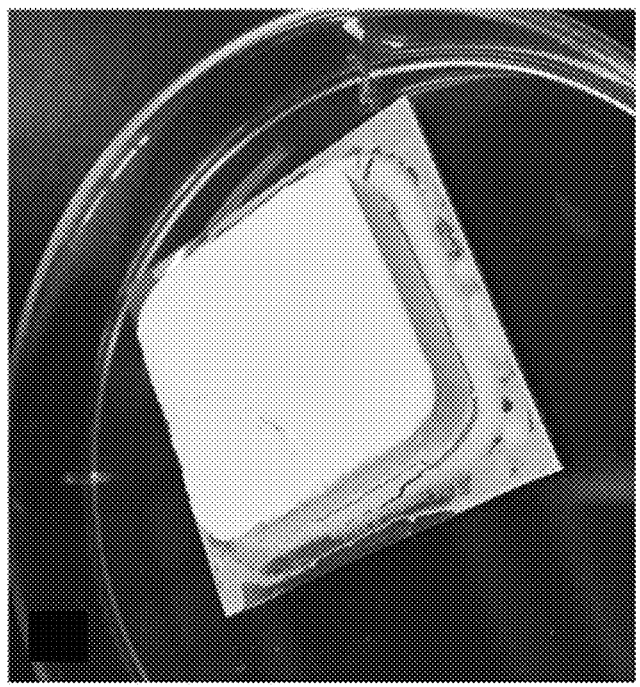
FIG. 4 is an image of an exemplary reference material printed by EPD prior to calcining.

An exemplary reference material printed by EPD prior to sintering in a reducing atmosphere is shown in FIG. 4. The sample size of the reference material is approximately 20×20×4 mm$^3$. Any EPD technique may be used to print the samples using the doped synthesized particles as feedstock particles. Although EPD is the preferred method of manufacture, other additive manufacturing methods may be used. Other additive manufacturing methods include inkjet printing, direct ink writing, screen printing, dip coating, spin coating, etc.

The printed samples may contain organics and/or water that may be driven off (e.g., via calcining). If desired, thermal treatments may be used to transform the printed samples into a densified amorphous or crystalline solid as the final reference material (e.g., densifying via sintering). Alternatively, depending on the composition and application of the reference material, the particles may be analyzed as-is without any thermal processing.

Figure 5:
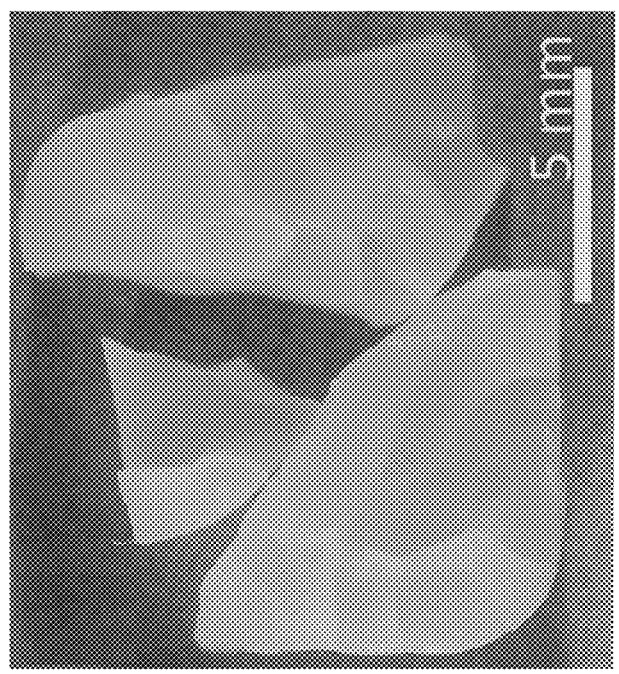
FIG. 5 is an image of an exemplary reference material printed by EPD after calcining and sintering in a reducing atmosphere.

An exemplary reference material printed by EPD after calcining and sintering in a reducing atmosphere is shown in FIG. 5.

Calcining may be performed in a controlled atmosphere of air, pure oxygen ($O_2$), a gas or any combination of gases including $CO_2$, CO, $N_2$, Ar, $H_2$, etc., or utilizing a graphite crucible heated in air to create a locally reducing atmosphere. Alternatively, the printed samples may be calcined and sintered in evacuated quartz capsules, with mineral assemblages placed in the capsules to buffer the oxygen partial pressure inside the capsule. The atmospheric composition and temperature control the oxidation state of elements (e.g., whether iron exists as $Fe^0$, $Fe^{2+}$, or $Fe^{3+}$). The printed samples may be calcined and sintered at a temperature below the melting point of the sample to obtain an anhydrous solid.

The conditions for thermal treatment may be chosen depending on the chemistry of the analyte in the printed sample, as would be determinable by one having ordinary skill in the art upon reading the present disclosure.

Figure 9:
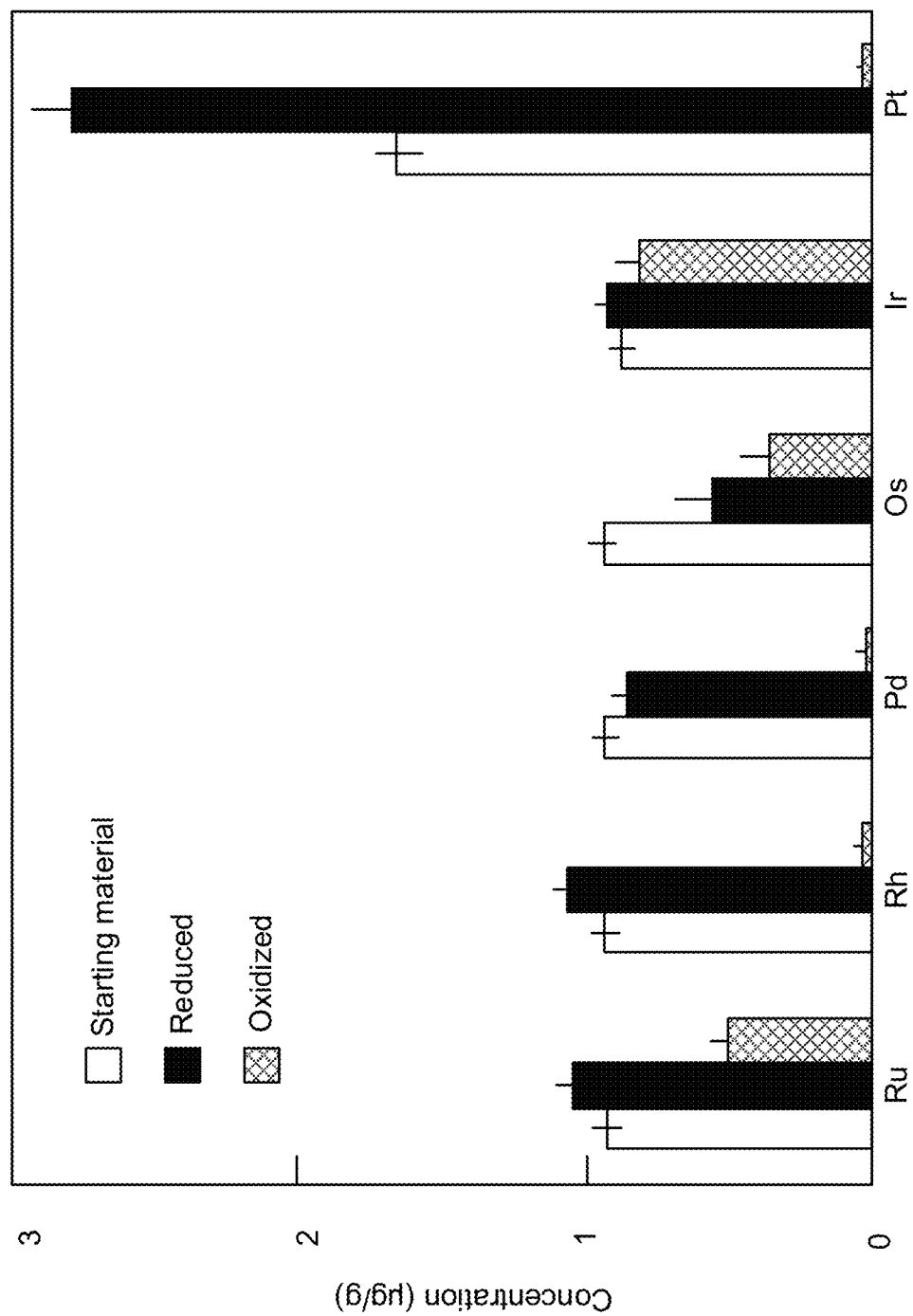
FIG. 9 is a chart displaying the concentrations of three samples of an exemplary sample before calcination and after calcining and sintering in different atmospheric conditions.

For example, FIG. 9 shows that thermal processing in an oxidizing environment quantitatively removes Rh, Pd, and Pt from the silica particles. In a reducing atmosphere, these elements are fully or partially retained in the sample.

The printed samples may be sintered at a temperature below the melting point of the sample to obtain a densified solid as shown in FIG. 5.

The heat treatment (e.g., thermal processing) may depend on the matrix composition and/or the intended use of the reference material as would be determinable by one having ordinary skill in the art upon reading the present disclosure. For example, for biological samples, calcining and sintering the samples are unnecessary. For some samples, the sample is directly sintered. For yet other samples, calcining and sintering may be done in one step in which temperature is ramped from room temperature to the final sintering temperature (e.g., a temperature up to thousands of degrees).

In various approaches, the time for the heat treatment may range from 0 hours to a few hours as would be determinable by one of ordinary skill in the art in consideration of the intended use of the reference materials. For example, biological and particulate-based reference materials do not require calcining or sintering.

Figure 6:
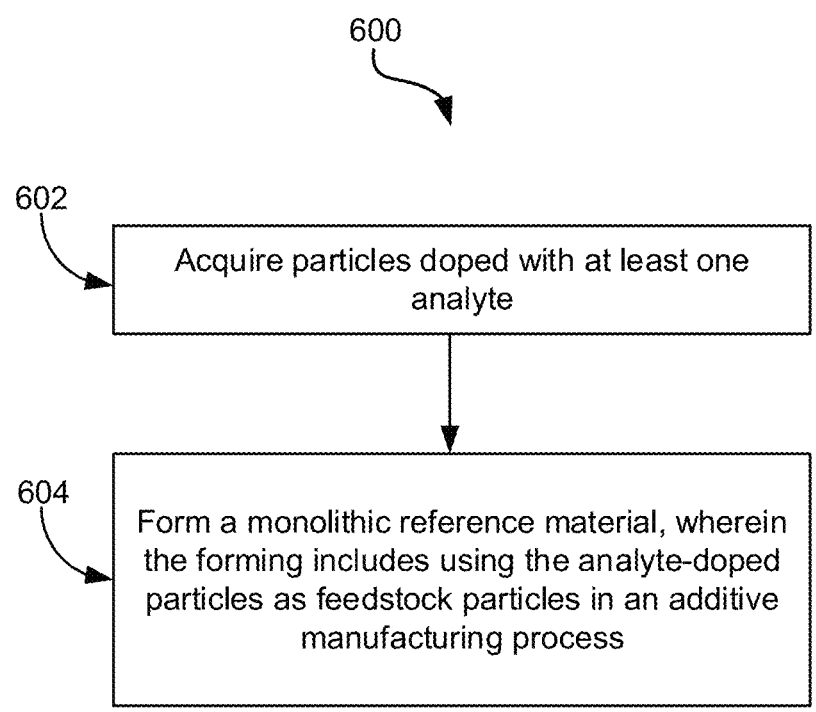
FIG. 6 is a flowchart of a method, according to one approach of the present disclosure.

Now referring to FIG. 6, a flowchart of a method 600 is shown according to one approach. The method 600 may be performed in accordance with the present invention in any of the aspects depicted in FIGS. 1-5 and 7-11, among others, in various approaches. Of course, more or fewer operations than those specifically described in FIG. 6 may be included in method 600, as would be understood by one of skill in the art upon reading the present descriptions.

As shown in FIG. 6, method 600 includes operation 602. Operation 602 includes acquiring particles doped with at least one analyte. Acquiring the particles may include forming the particles in the presence of the dopant according to any of the operations described in detail above. Equivalently, acquiring the particles may include forming the particles in the presence of a precursor of the dopant. The particles may be synthesized according to any of the methods disclosed in detail above. In other approaches, synthesized particles may be obtained in any manner known in the art such as through a manufacturer, supplier, third party research facility, etc. In an exemplary approach, the synthesized particles are formed via a modified Stöber reaction.

Operation 602 may include doping the synthesized particles with at least one analyte, which can occur during or after growth of particles. The at least one analyte may be any of the analytes discussed in detail above. Any combination of analytes may be used as would be understood by one having ordinary skill in the art upon reading the present disclosure. In various approaches, analytes may be major elements, minor elements, or trace elements within the formed reference material.

In an exemplary embodiment, which is in no way intended to limit the present disclosure, the analyte-doped particles include platinum group elements (e.g., Ru, Rh, Pd, Os, Jr, and Pt).

Operation 604 includes forming a monolithic reference material. The forming includes using the analyte-doped particles as feedstock particles in an additive manufacturing process. In a preferred aspect, the additive manufacturing process includes EPD. In preferred approaches, any EPD technique may be used to print reference materials using the analyte-doped particles. Other additive manufacturing methods may be used including inkjet printing, direct ink writing, screen printing, dip coating, spin coating, etc. In preferred aspects, the monolithic reference material is a substantially single mass of analyte-doped particles.

In various approaches, forming the reference material further includes thermally processing a structure formed during the additive manufacturing process. Thermal processing may include calcining and/or sintering the structure below a melting point of the analyte-doped particles. Thermally processing the structure may include any of the conditions discussed in detail above and preferred configurations would be readily determinable by one having ordinary skill in the art in view of the intended use of the reference material. For example, the thermal processing may occur in a reducing atmosphere or in an oxidizing atmosphere depending on the synthesized particles, the analytes, the intended application, etc., or any combination thereof.

Reference materials may be synthesized by additive manufacturing according to various aspects described herein. Trace element concentrations of dissolved aliquots may be characterized by ICPMS, among other analytical techniques. Trace element distributions may be characterized by laser-ablation ICPMS, among other analytical techniques. In preferred embodiments, the reference materials exhibit relatively high homogeneity of the analytes in the reference material, indicated by low %RSD (percent relative standard deviation) of multiple analyses performed on the same reference material. In a preferred embodiment, the reference materials exhibit high homogeneity of the analytes indicated by less than about 3%RSD of the analyte in the bulk of the reference material. The formed product having PGE(s) preferably exhibits an inhomogeneity up to about 6%RSD of the PGE in the bulk of the reference material.

Various EPD process may be used to print reference materials comprising a variety of compositions. In preferred approaches, multi-material reference materials may be printed as tailored to the analyst's specifications. Traditionally, different reference materials are mounted in a 1 inch diameter epoxy and polished to obtain a flat surface. Materials are wasted using these conventional techniques if the reference materials do not have the same sizes initially. For example, some small reference materials may be polished away while the larger ones are not yet exposed to the surface of the epoxy.

In stark contrast, the problem of wasted materials may be avoided using various aspects described herein to produce reference materials with patterned compositions. The layered compositions may be mounted orthogonally to the analyzed surface. Such layered composition reference materials improve transport, mounting, polishing, etc., of the reference materials.

In a preferred aspect, an analyst requests reference materials with any arbitrary concentration(s) of analyte(s) in any matrix compositions. According to the various techniques disclosed herein, standards are distributed to the analyst. These standards have matrix compositions that match the known concentrations of the analyst's samples. The concentrations of analytes and major elements may be adjusted during the doping process, or by mixing of particles with different analyte(s) and major element concentrations. The printed reference materials produced according to various approaches described herein may be adjusted according to the requests of the consumer in terms of size, patterns, major, minor, and/or trace elements, elemental and/or isotopic compositions, etc.

Electrophoretic deposition of nanoparticles of different compositions may be used to produce layered reference materials with layers of precisely defined composition in a single solid block. In at least one configuration, electrophoretic deposition of nanoparticles of 5 different compositions may be used to produce layered reference materials in a single solid block. Each of the 5 compositions may include the same or different analyte in the same or different concentrations, suspended in the same or different matrix material. If desired, printed multi-material reference materials may be calcined and sintered as would be understood by one having ordinary skill in the art. The different feedstock particles may be printed sequentially or simultaneously. Different feedstock particles may be co-deposited in order to create matrices with multiple major elements and minor elements and trace elements and/or gradients of concentrations of analytes within the reference materials.

Uses

At least some of the aspects presented herein introduce microanalytical standards which greatly enhance the role of spatially-resolved elemental and isotopic analysis across disciplines. These standards enable absolute concentration measurements, where currently only relative signal intensities are measured. Such standards produced via the techniques disclosed herein may be used to validate in-situ elemental and isotope ratio measurements in different bulk matrices.

In one exemplary use case, a ruler (e.g., markings at an iterated standard distance) may be printed within the printed reference material throughout the sample to provide a distance metric for depth-profiling analyses.

In other exemplary use cases, reference materials generated by at least some of the approaches described herein may be used in any application which conventional reference materials are used.

Experiments

An example of the production and characterization of PGE reference materials in a silica ($SiO_2$) matrix is given below. Both the identities and amounts of matrix and trace elements and/or isotopes may be adjusted using the various approaches described above.

Synthesis of Feedstock Particles

Stöber particles (e.g., spherical particles that transform into silica after water and organics are burned off during calcining) were synthesized for use as starting materials. About 250 mL of concentrated ammonium hydroxide (puriss p.a. plus ≥25% $NH_3$ in $H_2O$; Sigma-Aldrich®, St. Louis, MO, USA), 19 mL of Milli-Q® water, and 1.4 L of ethanol (200 proof absolute, anhydrous ACS/VSP grade; Pharmco-AAPER®, Brookfield, CT, USA) were added into a 2 L beaker and stirred with a magnetic stir bar at ≥300 rpm. After 5 minutes, 10 mL of tetraethyl orthosilicate (TEOS) (≥99.9% TEOS; Sigma-Aldrich®) were added. After another 5 minutes, 463 µL of 2% $HNO_3$ containing 540 µg/mL of Nd (99.9% Nd nitrate hexahydrate; Sigma-Aldrich®, added as a procedural check), and 270 µL of 10% HCl containing 100 µg/mL of precious metals (Pt, Pd, Jr, Rh, Os, Ru, Au, Re; IV-STOCK 58; Inorganic Ventures®, Christiansburg, VA, USA) were added to the solution aiming for about 10 µg/g Nd and about 1 µg/g of precious metals in the particles after calcination. The doped solution was stirred for a further 5 minutes before the addition of another 10 mL of TEOS. The addition of TEOS was repeated every 10 minutes to reach a total of 100 mL of TEOS. After the final addition of TEOS, the solution was kept stirring for approximately one more hour, after which the particles were left to settle for over 24 hours. The supernatant was removed, and the resultant slurry was rinsed multiple times with ethanol. Secondary electron images (SEM) show that these particles are spherical in shape and have a diameter of about 800 nm (see FIG. 1).

Electrophoretic Deposition (EPD)

Prior to printing, the Stöber particles were washed again in ethanol by centrifuging at 1000 rpm for 5 minutes and resuspending in ethanol using tip sonication. The resistance of a suspension to particle aggregation is typically evaluated by measuring its zeta potential, for which an absolute value of greater than ±30 mV is considered appropriate for EPD. The zeta potential for the suspension, measured via dynamic light scattering using a Zetasizer® (Malvern®, Westborough, MA, USA) is −60.7 ±0.3 mV, indicating good stability of the suspension.

About 3-4 grams of Stöber particles were loaded in 45 mL of ethanol into a 60 mL syringe. The EPD cell (custom made at the Lawrence Livermore National Laboratory®, Livermore, CA, USA), comprised two parallel plates of Pt-coated silicon wafer in a Teflon® cell-body. The suspension was then pumped through the EPD cell at a rate of 10 mL/min and a voltage of 200 V was applied between the Pt-coated plates, depositing particles onto the positive electrode. Unused materials were collected in a second syringe on the downstream side of the cell-body. The pump direction was changed several times and materials from both syringes were deposited onto the sample to minimize material loss. Samples EPD4 and EPD5 both employed a deposition time of about 16 minutes with each sample being 3-4 mm thick (see FIGS. 4 and 5).

Thermal Treatment

The samples were calcined to transform the Stöber particles into anhydrous silica particles, and then sintered to obtain a consolidated product. The time and temperature required for calcining and sintering depend on the size of the particles, with smaller particles requiring lower temperature and/or shorter duration. These parameters were optimized by performing time-series experiments at different temperatures using test materials.

Sample weight loss plateaued at about 20 weight % after calcining at 600° C. for 1.5 hours. Sintering at 1400° C. for 15 minutes resulted in a densified product (see FIG. 5). In order to evaluate the effect of oxygen fugacity on the retention of PGEs in silica, EPD4 and EPD5 were broken into large fragments. Some fragments were calcined and sintered in open alumina crucibles in air while others were placed in graphite crucibles covered with lids to create a locally reducing environment for calcining and sintering. The atmospheric condition (e.g., oxidized, reduced, etc.) is given in the sample name where relevant.

Laser Ablation (LA)-ICPMS

Figure 7:
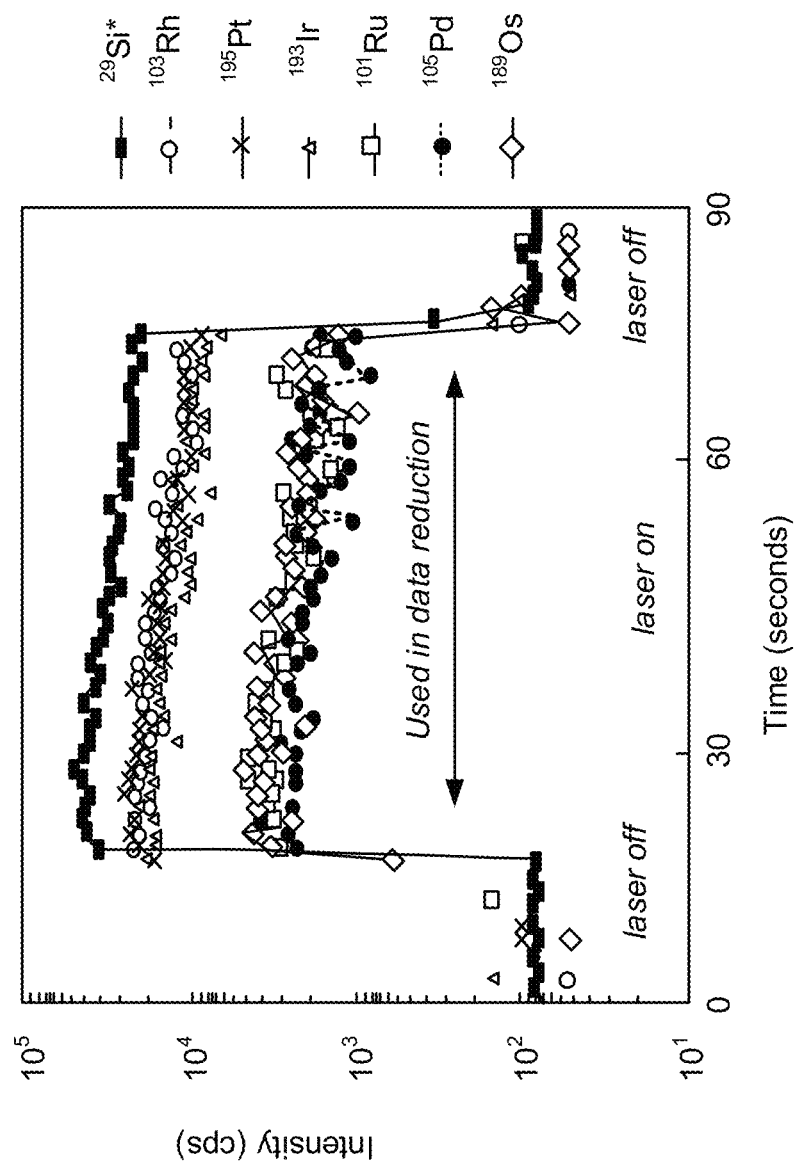
FIG. 7 is a chart of typical time-resolved LA-ICPMS spectra according to one approach of the present disclosure.

Samples were analyzed by LA-ICPMS. A 193 nm excimer laser (Photon Machines, Bozeman, MT, USA) equipped with a HelEx cell was used. The system was connected to an Element XR® ICPMS system (Thermo Fisher Scientific®, Waltham, MA, USA). The isotopes collected were $^{143,146}$Nd, $^{188,189}$Os, $^{191,193}$Ir, $^{194,195}$Pt, $^{105,108}$Pd, $^{103}$Rh, $^{99,101}$Ru, $^{185}$Re, $^{197}$Au and $^{29}$Si for internal normalization. All isotopes were measured in low-resolution mode. The Ar flow rate was about 1.0 L/min and He carrier gas flow rates were 0.5 L/min for both the cup insert and the sample cell. Laser ablation was performed using 65 or 150 μm spot diameters, 6 or 8 Hz repetition rates, and laser fluences of 4 or 6 J/cm$^2$, respectively. For data collection, the mass window (e.g., the region on the peak where data was collected) was set to be 20%. In this mass window, 5 ms integrations were taken at four positions so that each run consisted of an analysis time of 20 ms for each isotope. The number of runs was set to be 60 in a single pass, resulting in 90 seconds of data collection (e.g., 15 seconds before and after ablation and a 60 second ablation period). The data from the LA-ICPMS is shown in FIG. 7. The software laser ablation data reduction (LADR) (Norris Scientific, Molesworth, Australia) was used to visually inspect each time-resolved spectrum and to calculate average count rates for each isotope.

As shown in FIG. 7, the count rates for $^{29}$Si have been reduced by a factor of 1000 so that the spectrum for $^{29}$Si is plotted on the same scale as the PGEs. The count rates are zero where there are no data points shown. No metallic inclusions are detected in any spot analyses performed on EPD4 and EPD5.

Three types of samples were characterized using LA-ICPMS: EPD4-oxidized, EPD4-reduced, and EPD5-reduced. To evaluate the effect of calcining/sintering conditions, analyses were carried out on EPD4-oxidized and EPD4-reduced using a 150 μm spot diameter and the resulting data was compared. To assess the level of inhomogeneity, a quadrant of EPD4-reduced was analyzed by LA-ICPMS. Thirty-two 150 μm spot analyses were performed in a grid format on EPD4-reduced with points spaced 1.5 mm apart to encompass an analytical area of about 7.5×7.5 mm. To assess inhomogeneity in smaller sample volumes, the same procedure was repeated using 65 μm spot sizes each placed 100 μm below the 150 μm spots. To resolve spatial variations from the rim to the interior, two parallel lines of spots (150 μm and 65 μm) were placed over a distance of 3 mm. To assess whether EPD4-reduced and EPD5-reduced were compositionally identical, twenty 150 μm spots were placed on two fragments of EPD5-reduced and the data was compared with the EPD4-reduced data. The sample masses were calculated using depths of laser spots measured using a 6 M stylus profilometer (Veeco® Dektak®, Plainview, NY, USA). The sample masses were 3.4 μg and 0.35 μg for the 150 μm and 65 μm spots, respectively.

Alongside solution analyses, NIST® glasses were used as calibration standards for LA-ICPMS, using spot sizes of 150 μm. As NIST® glasses do not contain appreciable amounts of Os, Ir, and Ru, concentrations may only be determined for Nd, Pt, Pd, and Rh. As NIST® glasses display significant heterogeneities at the sample rim, multiple analyses (n=10 each) were carried out on the NIST® 610, 612, and 614 glasses in lines of spots to search for regions of homogeneity. After discarding analyses close to the rims, linear calibration curves were obtained for Nd, Pt, and Rh ($R^2$=1.00 for $^{143,146}$Nd, 0.99 for $^{194,195}$Pt and $^{103}$Rh). However, a linear calibration could not be obtained for Pd ($R^2$=0.80), probably due to interferences on $^{105}$Pd and $^{108}$Pd in NIST® 610. After removing the datum from NIST® 610, the quality of the regression for $^{105}$Pd improved significantly with $R^2$=0.99.

Solution ICPMS

Four fragments from EPD4-reduced and a piece of EPD4-sm (e.g., post-EPD and pre-calcine starting material) were characterized by solution ICPMS. Preliminary analyses were performed using 2% HNO$_3$+2% HCl as the solution matrix (all acids are baseline grade, Seastar Chemicals, Sidney, BC, Canada). However, the use of HNO$_3$ resulted in imprecise and underestimated PGE concentrations. The final procedure involved digesting 5 to 12 mg samples in 1.9 mL HCl+0.1 mL HF in 3 mL beakers (Savillex, Eden Prairie, MN, USA) at 120° C. Following complete digestion, 2.5% aliquots were taken and diluted by a factor of 100 using 2% HCl. Indium (also in 2% HCl) was added to this solution as an internal standard. Ruthenium and osmium are difficult elements to measure accurately due to their tendency to volatilize during digestion. Tests were performed to ensure that these elements were not lost during digestion. A procedural blank, as well as two precious metal ICPMS standards (Inorganic Ventures®, IV-STOCK 58), were "digested" in known amounts and diluted in the same manner as for the unknowns. These two "samples" plot on the same calibration curves that are independently defined by the fresh ICPMS standards (FIG. 8), suggesting that Ru and Os were not volatilized during the sample digestion.

Figure 8:
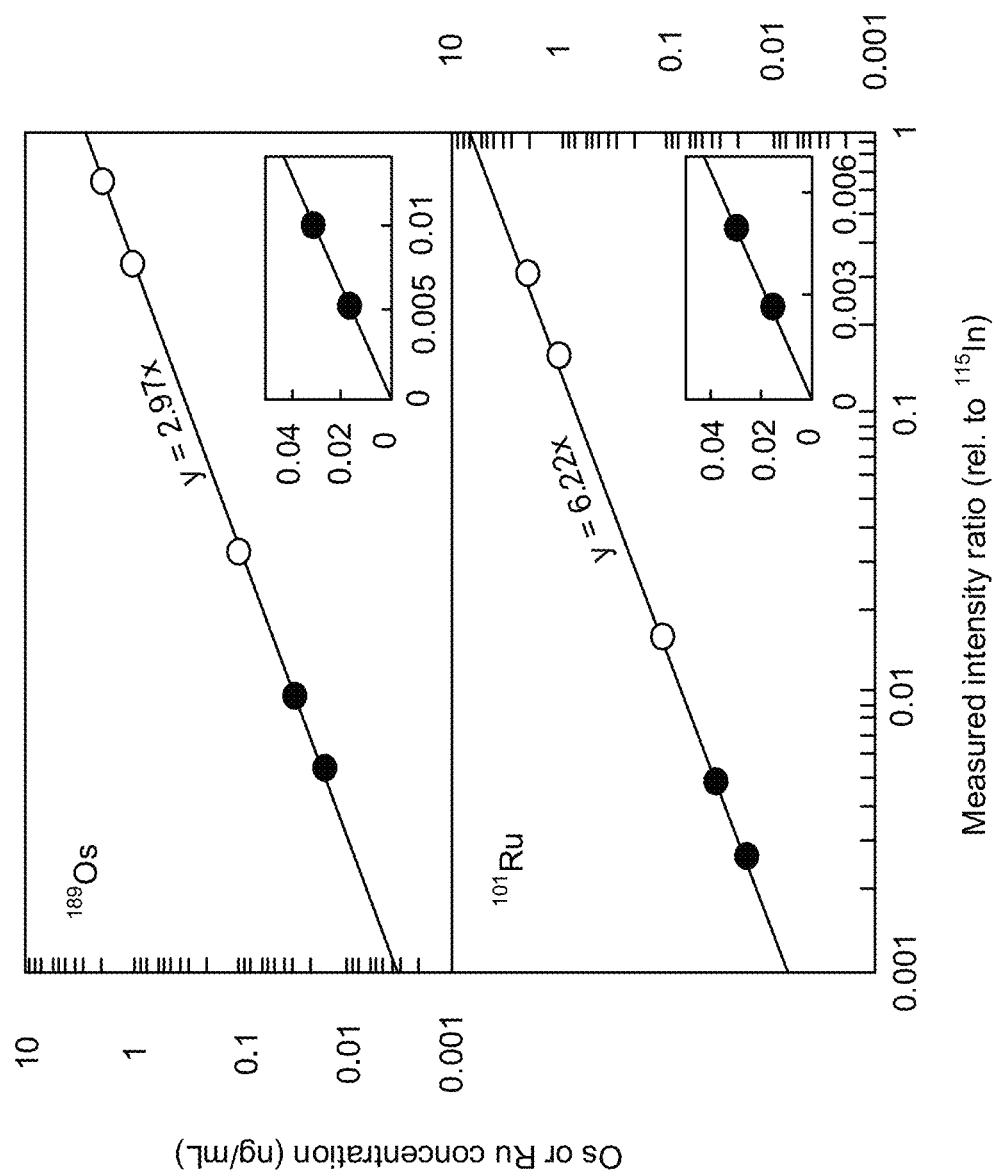
FIG. 8 is a chart depicting the solution ICPMS results for the digestion of osmium and ruthenium in an exemplary sample.

FIG. 8 shows the osmium and ruthenium digestion test results. Open symbols are freshly prepared standards used to define the calibration lines. Filled symbols are standard solutions that have gone through the same digestion and dilution procedure as unknowns. PGEs were not lost during digestion. Insets display the standards prepared as unknowns on a linear scale.

Solution ICPMS data were obtained in low resolution mode on the same Thermo Fisher Scientific® Element XR® ICPMS system. Oxide production, monitored by the $CeO^+/Ce^+$ ratio, was less than 4%. The mass window was 20%, in which signals were integrated at 20 positions each with an integration time of 10 ms, resulting in an analysis time of 200 ms for each isotope per run. Each sample was run 24 times (e.g., in 3 runs and 8 passes). The take-up time used was 160 seconds and the nebulizer flow rate was 200 µL/min. After every sample, the rinse solution was measured in the same manner as the samples to monitor memory effects, which were negligible compared to the signals. Seven matrix-matched calibration standards were prepared. Linear calibration curves were constructed using $^{115}$In as an internal standard. The RSD is estimated at about 5% based on long-term analysis of trace elements in geostandards.

Thermal Processing

Neodymium, being highly refractory as both an element and an oxide, is retained following thermal treatment regardless of the atmospheric composition. When calcining and sintering were performed in open air, the precious metals were either completely or partially lost as shown in FIG. 9.

FIG. 9 displays the concentrations of three samples of EPD4. The white bars refer to the concentrations before calcination. The black bars refer to concentrations after calcining/sintering in a reducing atmosphere. The patterned blocks refer to the concentrations after calcining/sintering in an oxidizing atmosphere (i.e., in air without graphite crucibles).

A reducing atmosphere was able to retain the PGEs, but the Au was quantitatively lost (not shown). The loss of Au suggests that the speciation of the PGEs (e.g., whether the PGEs exist in −1, 0, +1, or +2 oxidation states) in silica depends on oxygen fugacity, and that, under oxidizing conditions, PGEs are more volatile. Accordingly, samples sintered under reducing conditions were fully characterized using laser ablation and solution ICPMS. Rhenium was found to be absent in all samples. However, ICPMS analyses on EPD4-sm show that rhenium was not successfully incorporated into the Stöber particles, rather than lost during thermal treatment.

Inhomogeneity Determined by LA-ICPMS

The samples, EPD4-reduced and EPD5-reduced, were characterized for chemical inhomogeneity in two ways: (1) by sampling throughout the entire sample and (2) by excluding data collected in the outermost 1 mm rims. These two approaches only make a difference for Pt and Pd. The Pt concentrations increase by a factor of 2 in the outermost 80 µm of the sample compared with the homogeneous interior. Conversely, Pd is four times less concentrated at the rim, but over a greater distance of about 1 mm as shown in FIG. 10.

Figure 10:
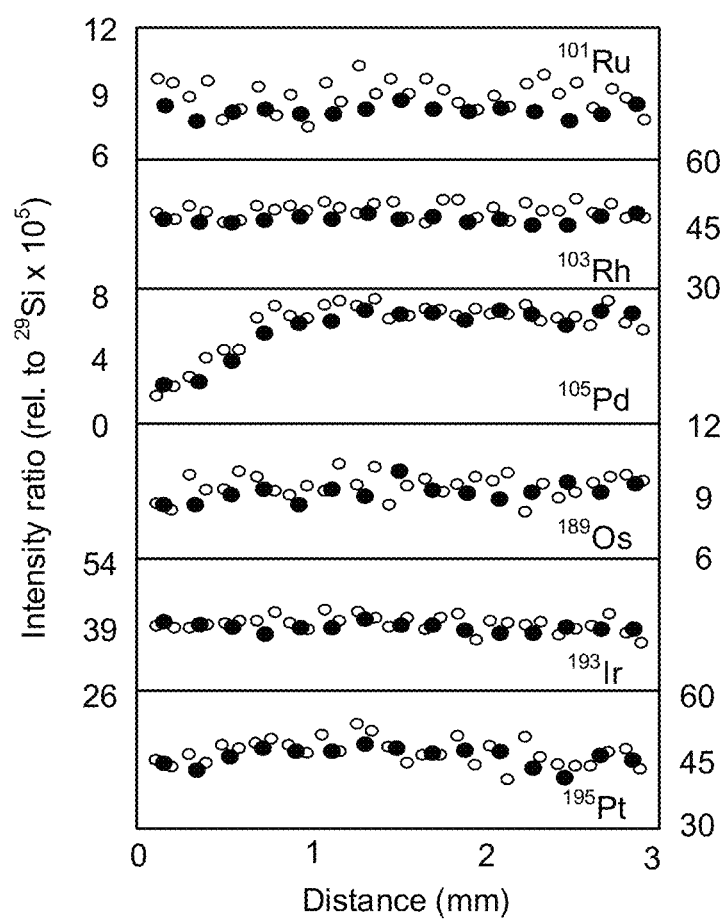
FIG. 10 is a chart displaying PGE concentration profiles from the rim to interior of the exemplary sample sintered in a reducing atmosphere.

FIG. 10 shows PGE concentration profiles from rim (at 0 mm) to interior on sample EPD4-reduced. Scales are chosen such that the height of each panel represents a factor of 2 difference in concentration, except for Pd, where a profile is detected within 1 mm of the rim. The larger, filled symbols are data obtained using a spot size of 150 µm. The smaller, unfilled symbols are data obtained using a spot size of 65 µm.

Palladium has the highest vapor pressure amongst the PGEs which may explain its low concentration at the rim, as shown in FIG. 10. The observation that Pd displays a resolvable compositional profile suggests that palladium has the fastest diffusion rate in silicate glass amongst the PGEs (e.g., a similar Pd concentration profile was also observed in studies with NIST® 614). Including the surface and rim analyses, the RSD for Pt is 22% and the RSD for Pd is 32%. Excluding analyses carried out at the outermost 1 mm of the sample (e.g., an approach taken when characterizing NIST® glasses), Pt and Pd are inhomogeneous at the 5% RSD level.

All other PGEs display homogeneity levels at 2-4%RSD in the interior and/or near the rim of the samples. The %RSD values listed in FIG. 11 are conservative estimates because the uncertainty from reproducibility of measurements was not subtracted from the overall error (e.g., another approach that has previously been taken when characterizing the NIST® glasses).

FIG. 11 is a table of RSD values associated with various samples produced by at least some of the approaches described herein. RSD$^\#$ refers to analyses performed 1 mm away from rim, except for Ru and Ir in NIST® 612-613. NIST® 610-613 data refer to sample volumes of 1 µg, also except for Ru and Ir in NIST® 612-613. The data of this study is applicable to sample volumes between 0.35 µg and 3.4 µg.

Although the %RSD values were obtained using 150 µm spot sizes (e.g., with a sample mass of 3.4 µg), the inhomogeneity levels are similar at the smaller volumes sampled by the 65 µm (e.g., with a sample mass of 0.35 µg). For the 65 µm spots, signals were as low as 300 cps so that reproducibility of measurement contributed significantly to the overall errors. The reproducibility of measurements was assessed using ten repeat measurements made on NIST® 614 and 612 in which signals on $^{143}$Nd and $^{146}$Nd signals bracketed those of the PGEs in the EPD samples. Based on the $^{143}$Nd and $^{146}$Nd signals, the reproducibility of measurements was estimated to be 2.7% for all PGEs. After quadratically subtracting this from the apparent %RSD values, the %RSD values resulting from sample inhomogeneity are within 1% of those reported in FIG. 11. The similarity in inhomogeneity levels at 150 µm and 65 µm spot sizes is corroborated by the line profiles probed by the two spot sizes which are nearly identical as shown in FIG. 10. No statistically significant correlation is shown between the PGEs.

FIG. 11 lists some commonly used standards for LA-ICPMS analysis of the PGEs with their concentrations and levels of homogeneity represented by %RSD. The EPD4-reduced and EPD5-reduced samples produced in this study display %RSDs that are comparable to the most homogeneous standards currently in use. More importantly, the homogeneity of EPD4-reduced and EPD5-reduced show an improvement over any existing silicate glass standards (e.g., NIST® glasses, HSE-I, etc.). This advance permits the analysis of PGE-bearing silicate minerals and glasses using more closely matrix-matched standards, while retaining analytical precision. Many of the standards listed in FIG. 11 are "in-house" materials that are not available to the wider community because they are limited in quantity (e.g., HSE-I, JB-sulfide, Ge4, etc.). The method described herein produced two standards that are about 20×20×4 mm$^3$ in size, large enough to be distributed across multiple institutions for inter-laboratory exercises and for method development/comparison including destructive analyses. Samples created from the same feedstock (e.g., EPD4 and EPD5) also have near-identical PGE concentrations, suggesting that multiple standard blocks may be created from a single large batch of PGE-doped Stöber particles. No existing silicate standard contains the full complement of PGEs in sufficient quantities for microanalysis. The samples fabricated by the approaches disclosed herein are thus unique in their ability to be used for in-situ analyses of the full suite of PGEs.

Concentrations in the Final Products

When multiple isotopes of the same element were collected, data reduction was performed using each isotope. The resulting elemental concentrations always agreed within 3%, which suggests that interferences, if any, are not present in significant amounts. In EPD4-reduced, Nd and Rh are two elements that display relatively high levels of homogeneity throughout, and for which analyses by both laser ablation and soluation ICPMS may be obtained and compared. LA-ICPMS measured 10.4 µg/g Nd (5% RSD) and 1.06 µg/g Rh (2%RSD), whereas solution ICPMS measured 9.91 µg/g Nd (3% RSD) and 1.09 µg/g Rh (3%RSD). Therefore, various comparisons made between the two analytical techniques show that the results agree.

Solution data for Pt and Pd in EPD4-reduced display large variabilities at 11% RSD and 17%RSD, respectively. The variabilities are likely the result of concentration variations at the rims of the samples. Therefore, LA-ICPMS data was used to determine the interior concentrations. LA-ICPMS gave a Pt concentration of 2.79 µg/g and a Pd concentration of 0.85 µg/g in the interior. Solution data for Os also displays high variability at 24%RSD, but LA-ICPMS data show that inhomogeneity is only at the 3% RSD level. The source of the variability in the Os solution data is unknown, although tests confirm that Os was not volatilized during digestion and ICPMS analyses display well-behaved Os signals for these tests (see FIG. 8). Solution data for Ru and Ir displays relatively high levels of reproducibility with RSD values of about 5%, similar to the long-term reproducibility of trace element analyses of geostandards. LA-ICPMS data for Pt, Rh, and Pd, and solution data for Os, Ru, and Ir, are reported in FIG. 11. The absolute concentration of Os is relatively uncertain.

The samples, EPD4-reduced and EPD5-reduced, are compositionally similar. As the concentrations for EPD4-reduced have been determined by solution ICPMS, EPD4-reduced is used as a calibration standard to obtain concentrations for EPD5-reduced (see FIG. 11). The two samples are compositionally identical except for Pt. Relative to EPD4-reduced, EPD5-reduced is less concentrated in Pt by about 10%. There is a possibility of Pt contamination introduced by the use of Pt-coated silicon wafers during the EPD process and subsequently from furnace components. Although the PGEs were added in equal proportions to the starting materials, the concentrations in the final products differ. Specifically, Pt concentrations are higher than the expected maximum of about 1 µg/g (see FIG. 10). The level of Pt contamination at about 2-3 µg/g is similar to those seen in NIST® 610, 612, and 614. Further approaches may be used to prevent Pt contamination. Excepting Pt, the results demonstrate various approaches described herein produce multiple, chemically homogenous, cm-sized, PGE standards with a silicate matrix.

The method of sample synthesis outlined here has been effective in generating relatively homogenous PGE concentrations with a silicate matrix. Different matrices may be used to further improve homogeneity and the incorporation/retention of other elements, such as Re, Au, and Pd. Nanoparticle synthesis methods for different compositions have been previously documented. These particles may be coated with $SiO_2$ to create silicate matrices with one or more major elements. Various approaches described herein may be adapted for use with these nanoparticle synthesis methods as would be understood by one having ordinary skill in the art upon reading the present disclosure. The methods presented herein generate reference materials that are tunable with regard to their trace element content and matrix composition, as well as suitable for manufacture in sufficient quantities to serve the entire analytical community.

Two cm-sized PGE standards with near-identical compositions and a silica matrix have been synthesized using additive manufacturing methods according to the approaches described herein. Laser ablation ICPMS data confirmed homogeneity for Ru, Rh, Os, and Ir. The concentrations of Pt and Pd varied within the outermost 1 mm of the sample but are homogenous throughout the interior. If the rim is avoided, all the PGEs display inhomogeneity at the level of 2-5%RSD. This is the most homogeneous PGE standard synthesized in a silicate matrix. Compared with the NIST® glasses, the samples show an improvement in homogeneity for Pt, Pd, and Rh at similar concentration ranges (0.5-3 µg/g). The samples include 0.5-1 µg/g of Ir, Os, and Ru (e.g., elements that are essentially absent from the NIST® glasses). The synthesis procedure fulfills the analytical community's long-term need for a homogenous PGE standard that can be produced in large quantities. Additive manufacturing has the potential to produce matrix-matched solid standards for advancing chemical and isotope analytical capabilities.

The inventive concepts disclosed herein have been presented by way of example to illustrate the myriad features thereof in a plurality of illustrative scenarios, approaches, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various approaches have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A method, comprising:
acquiring Stöber particles doped with an analyte, wherein the analyte is a minor element or a trace element;
forming a monolithic reference material, wherein the forming includes using the analyte-doped particles as feedstock particles in an additive manufacturing process; and
heating the monolithic reference material for calcining and/or densifying the monolithic reference material thereby creating a calibration standard.

2. The method of claim 1, wherein the additive manufacturing process includes electrophoretic deposition (EPD).

3. The method of claim 1, wherein the heating includes sintering below a melting point of the analyte-doped particles for causing the densifying.

4. The method of claim 1, wherein the heating occurs in a reducing atmosphere.

5. The method of claim 1, wherein the heating occurs in an oxidizing atmosphere.

6. The method of claim 1, wherein the analyte-doped particles include platinum group elements (PGEs) selected from the group consisting of: Ru, Rh, Pd, Os, Ir and Pt.

7. The method of claim 1, wherein forming the reference material comprises controlling a concentration of the analyte in a bulk of the reference material.

8. The method of claim 1, wherein forming the reference material comprises controlling the additive manufacturing process to create pre-defined patterns of the analyte-doped particles in geometries configured for microanalytical analyses.

9. The method of claim 1, wherein acquiring the particles includes forming the particles in the presence of the analyte.

10. The method of claim 1, wherein acquiring the particles includes doping synthesized particles.

11. The method of claim 1, wherein the monolithic reference material has a predefined gradient of the analyte.

12. The method of claim 1, wherein acquiring the particles includes forming the particles in the presence of a precursor of the analyte.

13. The method of claim 1, wherein the monolithic reference material has a ruler formed therein to provide a distance metric.

14. The method of claim 1, wherein the monolithic reference material is formed on a substrate, and comprising removing the formed monolithic reference material from the substrate.

15. The method of claim 14, wherein acquiring the Stöber particles includes forming the analyte-doped particles via a modified Stöber reaction that occurs in the presence of the analyte.

16. The method of claim 1, wherein the monolithic reference material is formed into a structure, and comprising calcining the formed structure for transforming the analyte-doped particles in the formed structure.

17. The method of claim 16, comprising thermally processing the formed structure, the thermal processing including sintering below a melting point of the analyte-doped particles.

18. The method of claim 16, wherein the formed structure has a predefined gradient of the analyte.

19. The method of claim 1, wherein the formed monolithic reference material is self-supporting.

* * * * *